(12) United States Patent
Keskar et al.

(10) Patent No.: US 11,276,002 B2
(45) Date of Patent: Mar. 15, 2022

(54) HYBRID TRAINING OF DEEP NETWORKS

(71) Applicant: salesforce.com, inc., San Francisco, CA (US)

(72) Inventors: Nitish Shirish Keskar, San Bruno, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 1031 days.

(21) Appl. No.: 15/926,768

(22) Filed: Mar. 20, 2018

(65) Prior Publication Data

US 2019/0188568 A1    Jun. 20, 2019

Related U.S. Application Data

(60) Provisional application No. 62/608,078, filed on Dec. 20, 2017.

(51) Int. Cl.
*G06N 3/08* (2006.01)
*G06N 3/04* (2006.01)

(52) U.S. Cl.
CPC ........... *G06N 3/082* (2013.01); *G06N 3/0427* (2013.01)

(58) Field of Classification Search
CPC .............................. G06N 3/082; G06N 3/0427
See application file for complete search history.

(56) References Cited

U.S. PATENT DOCUMENTS

| | | |
|---|---|---|
| 8,121,367 B2 | 2/2012 | Socher et al. |
| 8,355,550 B2 | 1/2013 | Zhang et al. |
| 10,282,663 B2 | 5/2019 | Socher et al. |
| 10,346,721 B2 | 7/2019 | Albright et al. |
| 2016/0350653 A1 | 12/2016 | Socher et al. |
| 2017/0024645 A1 | 1/2017 | Socher et al. |

(Continued)

OTHER PUBLICATIONS

Im, Daniel Jiwoong et al. "An empirical analysis of the optimization of deep network loss surfaces" arXiv [Published 2017] [Retrieved Apr. 2021] <URL: https://arxiv.org/abs/1612.04010> (Year: 2017).*

(Continued)

*Primary Examiner* — Ann J Lo
*Assistant Examiner* — Fen Christopher Tamulonis
(74) *Attorney, Agent, or Firm* — Haynes and Boone, LLP

(57) ABSTRACT

Hybrid training of deep networks includes a multi-layer neural network. The training includes setting a current learning algorithm for the multi-layer neural network to a first learning algorithm. The training further includes iteratively applying training data to the neural network, determining a gradient for parameters of the neural network based on the applying of the training data, updating the parameters based on the current learning algorithm, and determining whether the current learning algorithm should be switched to a second learning algorithm based on the updating. The training further includes, in response to the determining that the current learning algorithm should be switched to a second learning algorithm, changing the current learning algorithm to the second learning algorithm and initializing a learning rate of the second learning algorithm based on the gradient and a step used by the first learning algorithm to update the parameters of the neural network.

20 Claims, 12 Drawing Sheets

(56) References Cited

U.S. PATENT DOCUMENTS

| | | |
|---|---|---|
| 2017/0032280 A1 | 2/2017 | Socher et al. |
| 2017/0140240 A1 | 5/2017 | Socher et al. |
| 2018/0082171 A1 | 3/2018 | Merity et al. |
| 2018/0096219 A1 | 4/2018 | Socher |
| 2018/0096267 A1 | 4/2018 | Masekara et al. |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0336198 A1 | 11/2018 | Zhong et al. |
| 2019/0108432 A1 | 4/2019 | Lu et al. |
| 2019/0108439 A1 | 4/2019 | Lu et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |

OTHER PUBLICATIONS

Akiba et al., "Extremely Large Minibatch SGD: Training ResNet-50 on ImageNet in 15 minutes," arXiv preprint arXiv:1711.04325 pp. 1-4, (Nov. 12, 2017).

Bahdanau et al., "Neural Machine Translation by Jointly Learning to Align and Translate," arXiv preprint arXiv:1409.0473, pp. 1-15, (May 19, 2016).

Bradbury et al., "Quasi-Recurrent Neural Networks," arXiv preprint arXiv:1611.01576, pp. 1-11, (Nov. 21, 2016).

Deng et al., "ImageNet: A Large-Scale Hierarchical Image Database," Dept. of Computer Science, Princeton University, CVPR09, pp. 1-8 (2009).

Duchi et al., "Adaptive Subgradient Methods for Online Learning and Stochastic Optimization," The Journal of Machine Learning Research, 12:2121-2159 pp. 1-39 (2011).

Han et al., "Deep Pyramidal Residual Networks," arXiv preprint arXiv:1610.02915, pp. 1-9, (Sep. 6, 2016).

Hardt et al., "Train Faster, Generalize Better: Stability of Stochastic Gradient Descent," arXiv preprint arXiv:1509.01240, pp. 1-32, (Feb. 7, 2016).

He et al., "Deep Residual Learning for Image Recognition," arXiv preprint arXiv:1512.03385, pp. 1-15, (Dec. 10, 2015).

Hochreiter et al., "Long Short-Term Memory," Massachusetts Institute of Technology, Neural computation, vol. 9 pp. 1735-1780, (1997).

Hu et al., "Squeeze-and-Excitation Networks," arXiv preprint arXiv:1709.01507, pp. 1-11, (Sep. 5, 2017).

Andola et al., "DenseNet: Implementing Efficient ConvNet Descriptor Pyramids," Technical Report, University of California, Berkeley, arXiv preprint arXiv:1404.1869, pp. 1-11(Apr. 7, 2014).

Karpathy, "A Peek at Trends in Machine Learning," https://medium.com/@karpathy/apeek-at-trends-in-machine-learningab8a1085a106 (Dec. 12, 2017).

Kingma et al., "Adam: A Method for Stochastic Optimization," Published as a conference paper at ICLR (International Conference on Learning Representations), ArXiv e-prints arXiv: arXiv:1412.6980, pp. 1-15, (Jan. 30, 2017).

Krizhevsky, Alex, "Learning Multiple Layers of Features from Tiny Images," pp. 1-60 (Apr. 8, 2009).

Lee et al., "Gradient Descent Converges to Minimizers," University of California, Berkeley, ArXiv e-prints arXiv:1602.04915, pp. 1-11 (Mar. 4, 2016).

Loshchilov et al., "Fixing Weight Decay Regularization in Adam," ArXiv e-prints arXiv:1711.05101, pp. 1-13 (Feb. 14, 2018).

Loshchilov et al., "SGDR: Stochastic Gradient Descent with Warm Restarts," ArXiv e-prints arXiv:1608.03983, pp. 1-16 (May 3, 2017).

Mandt et al., "Stochastic Gradient Descent as Approximate Bayesian Inference," Journal of Machine Learning Research, vol. 18, ArXiv e-prints arXiv:1704.04289, pp. 1-35 (Jan. 19, 2018).

Merity et al., "Pointer Sentinel Mixture Models," arXiv preprint arXiv:1609.07843, pp. 1-13 (Sep. 26, 2016).

Merity et al., "Regularizing and Optimizing LSTM Language Models," arXiv preprint arXiv:1708.02182, pp. 1-10 (Aug. 7, 2017).

Mikolov et al. "RNNLM Recurrent Neural Network Language Modeling Toolkit," Center for Language and Speech Processing, Johns Hopkins University, Baltimore MA, 2011 ASRU Workshop, pp. 1-4 196-201 (2011).

Nocedal et al. "Numerical optimization," Second Edition, Springer Science & Business Media (2006) entire Book.

Reddi et al., "On the Convergence of Adam and Beyond", Published as a conference paper at International Conference on Learning Representations (ICLR), URL https://openreview.net/forum?id=ryQu7f-RZ pp. 1-23 (2018).

ROBBINS et al., "A Stochastic Approximation Method," The Annals of Mathematical Statistics, pp. 400-408 (1951).

Soudry et al., "The Implicit Bias of Gradient Descent on Separable Data," Published as a conference paper at ICLR (International Conference on Learning Representations), arXiv preprint arXiv:1710.10345, pp. 1-22 (Feb. 27, 2018).

Sutskever et al., "On the importance of initialization and momentum in deep learning," Proceedings of the 30th International Conference on Machine Learning, JMLR: W&CP vol. 28, (1139-1147), pp. 1-14 (2013).

Tieleman et al. "Lecture 6.5-RMSProp: Divide the gradient by a running average of its recent magnitude," Coursera: Neural Networks for Machine Learning, p. 4 (2012).

Wan et al., "Regularization of neural networks using drop connect," Dept of Computer Science, Courant Institute of Mathematical Science, NYU (In Proceedings of the 30th international conference on machine learning (ICML-13)), pp. 1058-1066 (2013).

Wilson et al., "The Marginal Value of Adaptive Gradient Methods in Machine Learning," ArXiv e-prints arXiv:1705.08292 pp. 1-14 (May 23, 2017).

Wu et al., "Google's Neural Machine Translation System: Bridging the Gap Between Human and Machine Translation," arXiv preprint arXiv:1609.08144, pp. 1-23 (Oct. 8, 2016).

Zhang et al., "Normalized Direction-preserving Adam.," arXiv preprint arXiv:1709.04546, pp. 1-12 (Sep. 13, 2017).

Zhang et al., "Understanding Deep Learning Requires Rethinking Generalization," arXiv preprint arXiv:1611.03530, pp. 1-15 (Feb. 26, 2016).

\* cited by examiner

| Model | Data Set | SGDM | Adam | SWATS | $\alpha_{k-1}$ | Switchover Point (epochs) |
|---|---|---|---|---|---|---|
| ResNet-32 | CIFAR-10 | 0.1 | 0.0001 | 0.0001 | 0.52 | 1.37 |
| DenseNet | CIFAR-10 | 0.1 | 0.0001 | 0.0001 | 0.79 | 11.54 |
| PyramidNet | CIFAR-10 | 0.1 | 0.0001 | 0.0007 | 0.85 | 4.94 |
| SENet | CIFAR-10 | 0.1 | 0.0001 | 0.0001 | 0.54 | 24.19 |
| ResNet-32 | CIFAR-100 | 0.3 | 0.0002 | 0.0002 | 1.22 | 10.42 |
| DenseNet | CIFAR-100 | 0.1 | 0.0001 | 0.0001 | 0.51 | 11.81 |
| PyramidNet | CIFAR-100 | 0.1 | 0.0001 | 0.0001 | 0.76 | 18.54 |
| SENet | CIFAR-100 | 0.1 | 0.0001 | 0.0001 | 1.39 | 2.04 |
| LSTM | PTB | 55† | 0.003 | 0.003 | 7.52 | 186.03 |
| QRNN | PTB | 35† | 0.002 | 0.002 | 4.61 | 184.14 |
| LSTM | WT-2 | 60† | 0.003 | 0.003 | 1.11 | 259.47 |
| QRNN | WT-2 | 60† | 0.003 | 0.004 | 14.46 | 295.71 |
| ResNet-18 | Tiny-ImageNet | 0.2 | 0.001 | 0.0007 | 1.71 | 48.91 |

† denotes that no momentum was employed for SGDM

FIG. 10

HYBRID TRAINING OF DEEP NETWORKS

RELATED APPLICATIONS

The present application claims priority to U.S. Provisional Patent Application Ser. No. 62/608,078 filed on Dec. 20, 2017 and entitled "Systems and Method for Hybrid Training of Deep Networks," which is incorporated by reference in its entirety.

TECHNICAL FIELD

The present disclosure relates generally to deep learning and more specifically to deep learning using a hybrid approach.

BACKGROUND

Deep learning on data sets is a valuable approach to learning the generalized nature of the data in the data sets. Many approaches to this problem utilize a neural network that is trained against a set of training data and then tested against a set of testing data. The neural network is trained by utilizing a cost function whose gradient is determined over an epoch in which each of the elements in the set of training data is evaluated by the neural network. The gradient is then used to update the weights used by the neurons in the neural network before the training data is presented to the neural network again, the gradient is re-determined, and the weights are updated again. This process continues until the neural network converges to a steady state (e.g., where the cost function is minimized) and/or the error rate for the testing data meets an accuracy criterion. The ability of the neural network to rapidly converge to a solution (e.g., in a reasonable number of epochs) may vary depending upon the data in the data sets, the learning rule used to adapt the weights based on the gradient, various scaling factors, learning rates, and/or the like.

Accordingly, it would be advantageous to have systems and methods for improving training of deep networks.

BRIEF DESCRIPTION OF THE DRAWINGS

FIG. 10 is a simplified diagram of training metadata according to some embodiments.

In the figures, elements having the same designations have the same or similar functions.

DETAILED DESCRIPTION

This description and the accompanying drawings that illustrate inventive aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
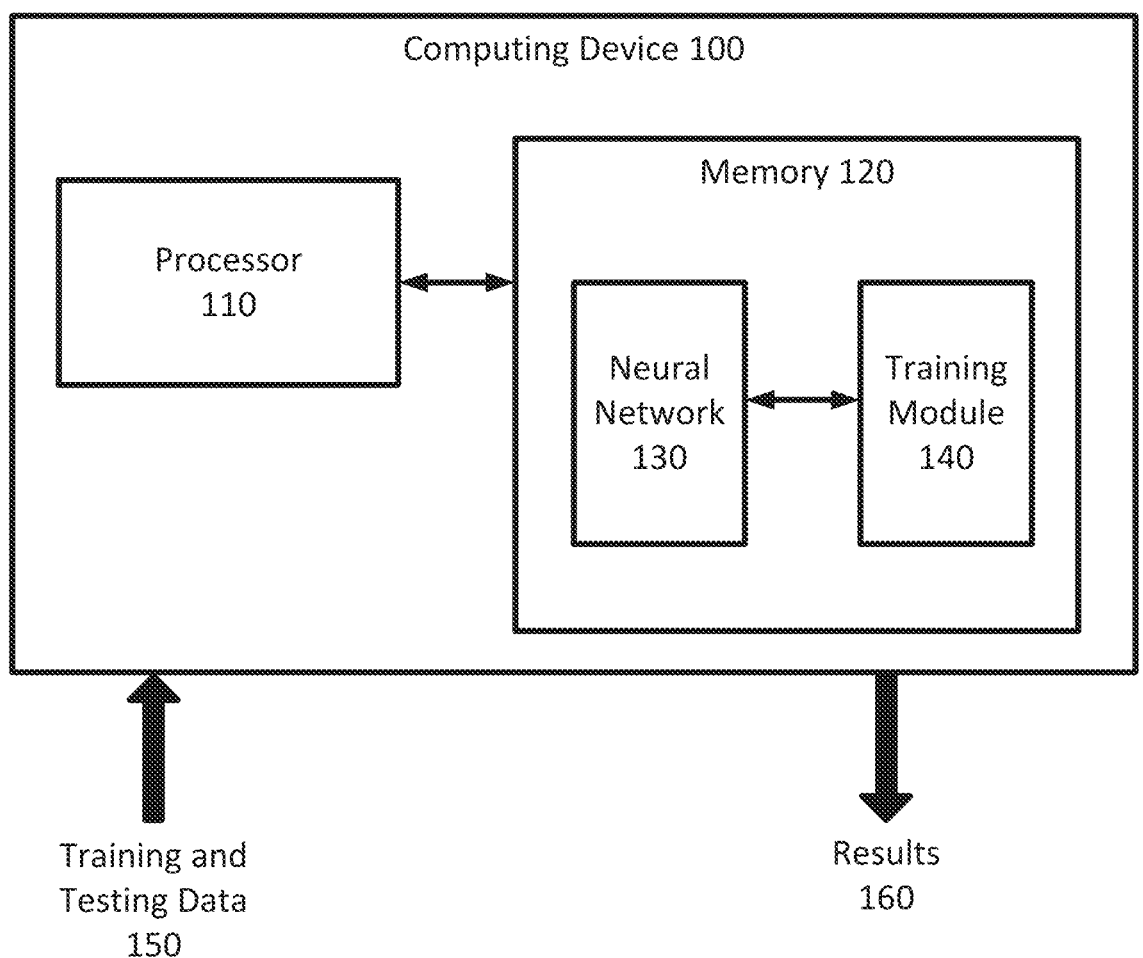
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network 130 and a training module 140. Neural network 130 may be used to implement and/or emulate any of the neural networks described further herein. In some examples, neural network 130 may include a multi-layer or deep neural network. In some examples, training module 140 may be used to handle the iterative training and/or evaluation of neural network 130 according to any of the training methods and/or algorithms described further herein. In some examples, memory 120 may include non-transitory, tangible, machine readable media that includes executable code that when run by one or more processors (e.g., processor 110) may cause the one or more processors to perform any of the methods described further herein.

As shown, computing device 100 receives training and/or testing data 150 and generates results 170. In some examples, training and/or testing data 150 may include a large number of training and/or testing samples that may each include input data to be presented to neural network 130 and a ground truth result that represents the expected and/or desired output of neural network 130 when the corresponding input data is presented to neural network 130. In some examples, the content and/or nature of the input data and/or the ground truth result may vary based on the purpose of neural network 130. In some examples, the input data may include one or more of text, images, video, questions and/or the like and the ground truth result may include text, numeric values, and/or the like. Some examples of possible input data and ground truth result types are described in further detail below. In some examples, training and/or testing data 150 may be divided into data used by training module 140 to train neural network 130 and data used to test neural network 130 to see how well it has learned the correct generalizations between the input data and the ground truth results. In some examples, once trained, neural network 130 may be used to receive input data that is not part of training and/or testing data 150, analyze the input data, and generate results 170 based on what neural network 130 learned during training.

According to some embodiments, examples of training and/or testing data 150 include CIFAR-10, CIFAR-100, Tiny-ImageNet, WikiText-2 (WT-2), Penn Treebank, and/or the like data sets. The CIFAR-10 and CIFAR-100 data set includes 50,000 32×32 RGB images in a training set and 10,000 32×32 RGB images in testing set that are to be classified into one of ten (CIFAR-10) or 100 (CIFAR-100) ground truth classifications. The CIFAR-10 and CIFAR-100 data sets are described in more detail in Krizhevsky, et al. "Learning Multiple Layers of Features from Tiny Images," 2009, which is incorporated by reference herein. The Tiny-ImageNet data set includes 500 2224×224 RBG images for each of 200 classes in a training set and 50 images for each of the 200 classes in the testing set. The Tiny-ImageNet data set is described in more detail in Deng, et al., "ImageNet: A Large-Scale Hierarchical Image Database," 2009 Conference on Computer Vision and Pattern Recognition, which is incorporated by reference herein. The WikiText-2 and Penn Treebank data sets include text-based data suitable for use in language translation and sequence learning for text with long-term dependencies. The WikiText-2 data set is described in further detail in Merity, et al., "Pointer Sentinel Mixture Models," arXiv:1609.07843, 2016, and the Penn Treebank data set is described in further detail in Mikolov et al., "RNNLM-Recurrent Neural Network Language Modeling Toolkit," Proceedings of the 2011 ASRU Workshop, pp. 196-201, each of which is incorporated by reference herein.

Figure 2:
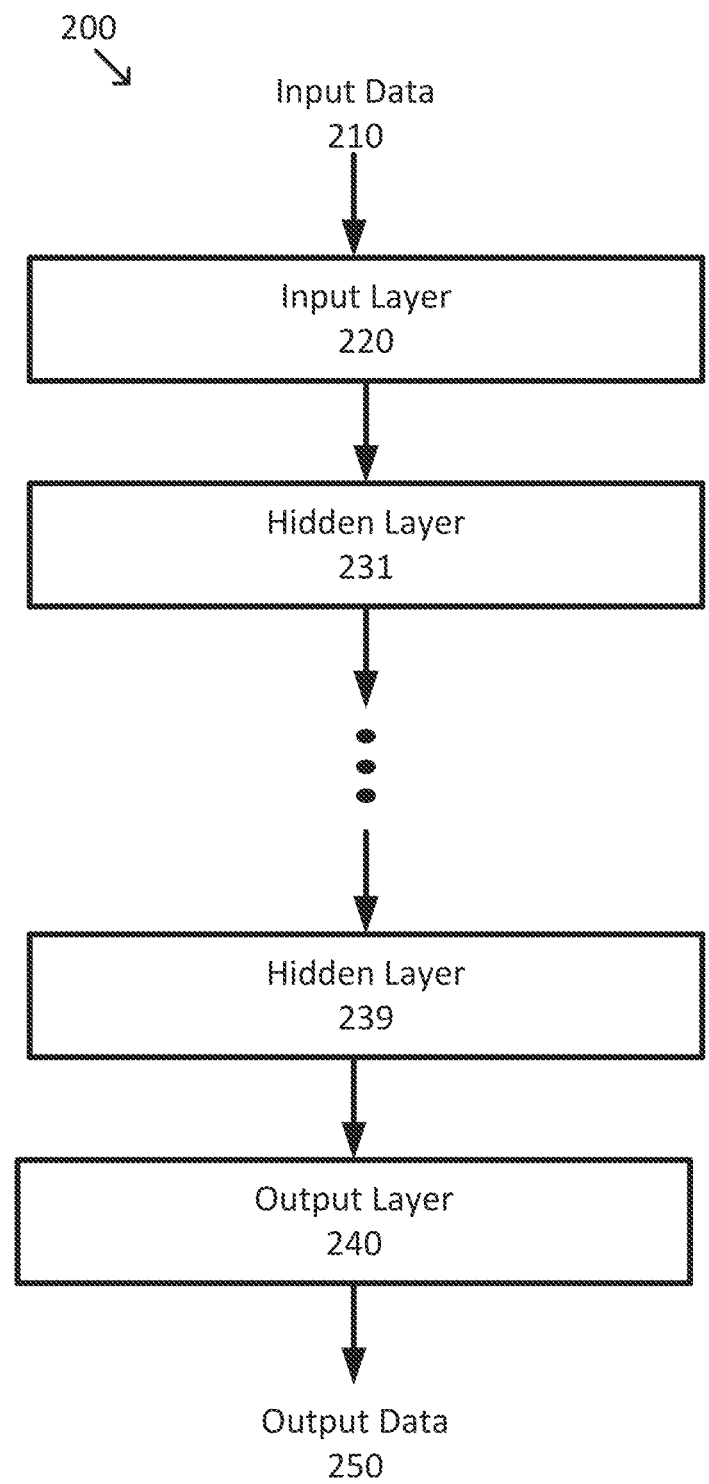
FIG. 2 is a simplified diagram of a multi-layer neural network according to some embodiments.

FIG. 2 is a simplified diagram of a multi-layer neural network 200 according to some embodiments. In some embodiments, neural network 200 may be representative of data 210 and processes input data 210 using an input layer 220. In some examples, input data 210 may correspond to the input data of training and/or testing data 150 and/or the input data not included as part of training and/or testing data 150. Input layer 220 includes a plurality of neurons that are used to condition input data 210 by scaling, range limiting, and/or the like. In some examples, each of the neurons in input layer 220 utilizes a transfer function that conditions one or more of input data 210 to apply a desired conditioning. Each of the neurons in input layer 220 generates an output that is fed to the inputs of a hidden layer 231. Hidden layer 231 includes a plurality of neurons that process the outputs from input layer 220. In some examples, each of the neurons in hidden layer 231 takes a combination (e.g., a weighted sum) of the outputs from input layer 220, adds an offset, and applies a transfer function. In some examples, the transfer function may be the log-sigmoid function, the hyperbolic tangent function, and/or the like. The outputs of hidden layer 231 are then propagated through one or more additional hidden layers that end with hidden layer 239. Hidden layer 239 includes a plurality of neurons that process the outputs from the previous hidden layer. In some examples, each of the neurons in hidden layer 239 takes a combination (e.g., a weighted sum) of the outputs from the previous hidden layer, adds an offset, and applies a transfer function. In some examples, the transfer function may be the log-sigmoid function, the hyperbolic tangent function, and/or the like. In some examples, each of hidden layers 231-139 may have a same or different number of neurons, a same or different transfer function, and/or the like. The outputs of hidden layer 239 are fed to an output layer 240. Output layer 240 includes a plurality of neurons that are used to condition the output from hidden layer 239 by scaling, range limiting, and/or the like. In some examples, each of the neurons in output layer 240 utilizes a transfer function that conditions one or more of the output from hidden layer 239 to apply a desired conditioning. It should be understood that the architecture of neural network 200 is representative only and that other architectures are possible, including a neural network with only one hidden layer, a neural network without an input layer and/or output layer, a neural network with recurrent layers, and/or the like.

According to some embodiments, examples of multi-layer neural networks include the ResNet-32, DenseNet, Pyramid-Net, SENet, AWD-LSTM, AWD-QRNN and/or the like neural networks. The ResNet-32 neural network is described in further detail in He, et al., "Deep Residual Learning for Image Recognition," arXiv:1512.03385, 2015; the DenseNet neural network is described in further detail in Iandola, et al., "Densenet: Implementing Efficient Convnet Descriptor Pyramids," arXiv:1404.1869, 2014, the Pyramid-Net neural network is described in further detail in Han, et al., "Deep Pyramidal Residual Networks," arXiv: 1610.02915, 2016; the SENet neural network is described in further detail in Hu, et al., "Squeeze-and-Excitation Networks," arXiv:1709.01507, 2017; the AWD-LSTM neural network is described in further detail in Bradbury, et al., "Quasi-Recurrent Neural Networks," arXiv:1611.01576, 2016; each of which are incorporated by reference herein.

Referring back to FIG. 1, training module 140 may be used to train neural network 130 and/or neural network 200. According to some embodiments, training module 140 is responsible for iteratively applying the input data from training and/or testing data 150 to neural network 130, evaluating the output of neural network 130 relative to the corresponding ground truth value and controlling how the parameters (e.g., the trainable weights and/or biases) of neural network 130 are updated according to a learning algorithm. In general, the learning algorithm adjusts the parameters of neural network 130 to minimize a loss function as shown in Equation 1, where f is the loss function and w corresponds to the parameters of neural network 130. In some examples, loss function f may be an error function, such as the root means square (RMS) error between the expected ground truth values (from training and/or testing data 150) and the results 170 generated by neural network 130.

$$\min_{w \in R^n} f(w) \qquad \text{Equation 1}$$

A commonly used learning algorithm is stochastic gradient descent (SGD). SGD iteratively updates the parameters of a neural network according to Equation 2, where $w_k$ corresponds to the kth iterate of the parameters w of the neural network, $\alpha_k$ is a tunable step size or learning rate, and $\hat{\nabla} f(w_{k-1})$ is the stochastic gradient of loss function f computed at $w_{k-1}$. SGD is described in greater detail in Robbins et al. "A Stochastic Approximation Method," The Annals of Mathematical Statistics, pp. 400-407, 1951, which is incorporated by reference herein.

$$w_k = w_{k-1} - \alpha_{k-1} \hat{\nabla} f(w_{k-1}) \qquad \text{Equation 2}$$

A variation of SGD, called SGD with momentum (SGDM) uses the inertia of the iterates to accelerate the training process to update the parameters of the neural network according to Equation 3 where $\beta \in [0,1)$ is a momentum hyper-parameter and $v_0$ is an additional variable for the training that is initialized to 0. And while SGDM tends to accelerate the training of the neural network it introduces the training variable v and scales the gradient uniformly in all directions, which, in some examples, can be detrimental for ill-scaled problems. In some examples, the tuning of the learning rate $\alpha$ may be laborious. SGDM is described in further detail in Sutskever, et al. "On the Importance of Initialization and Momentum in Deep Learning," International Conference on Machine Learning," pp. 1139-1147, 2013, which is incorporated by reference herein.

$$v_k = \beta v_{k-1} + \hat{\nabla} f(w_{k-1})$$

$$w_k = w_{k-1} - \alpha_{k-1} v_k \qquad \text{Equation 3}$$

According to some embodiments, adaptive methods may be used to address some of the shortcomings of the SGD and SGDM learning algorithms by diagonally scaling the gradient via estimates of the curvature of the loss function f. Examples of adaptive algorithms include adaptive moment estimation (Adam), which is described in Kingma, et al., "Adam: A Method for Stochastic Optimization," International Conference on Learning Representations (ICLR 2015); adaptive gradient algorithm (Adagrad), which is described in Duchi et al., "Adaptive Subgradient Methods for Online Learning and Stochastic Optimization," The Journal of Machine Learning Research, 12:2121-2159, 2011; and root mean squared propagation (RMSprop), which is described in Tieleman, et al., "Lecture 6.5-RMSProp: Divide the Gradient by a Running Average of its Recent Magnitude," COURSERA: Neural Networks for Machine Learning, 4, 2012; each of which is incorporated by reference herein. In some examples, these methods may be interpreted as learning algorithms that use a vector of learning rates, one for each variable of the training that are adapted as the training algorithm progresses. This is different from SGD and SGDM which use a scalar learning rate uniformly for all variables of the training.

Adagrad updates the parameters of the neural network according to Equation 4 where v is initialized to zero and E is a small additive constant for numerical stability. However, because v is initialized to zero, the initial updates tend to be noisy and because $v_k$ is monotonically increasing in each dimension, the scaling factor monotonically decreases leading to slow learning progress.

$$w_k = w_{k-1} - \alpha_{k-1} \frac{\hat{\nabla} f(w_{k-1})}{\sqrt{v_{k-1}} + \epsilon} \qquad \text{Equation 4}$$

$$v_{k-1} = \sum_{j=1}^{k-1} \hat{\nabla} f(w_j)^2$$

In contrast to Adagrad where $v_k$ increases monotonically, RMSProp uses an RMS-based approximation using an exponential smoothing approach according to Equation 5 where v is also initialized to zero. Like Adagrad, the initial learning of RMSProp is also noisy, but the use of the running RMS average for $v_k$ results in faster learning progress.

$$w_k = w_{k-1} - \alpha_{k-1} \frac{\hat{\nabla} f(w_{k-1})}{\sqrt{v_{k-1}} + \epsilon} \qquad \text{Equation 5}$$

$$v_{k-1} = \beta v_{k-2} + (1 - \beta) \hat{\nabla} f(w_{k-1})^2$$

According to some examples, undesired behaviors of Adagrad and RMSProp are addressed through the use of a bias correction in Adam. Adam further uses an exponential moving average for the step in lieu of the gradient according to Equation 6.

$$w_k = w_{k-1} - \alpha_{k-1} \frac{\sqrt{1-\beta_2^k}}{1-\beta_1^k} \frac{m_{k-1}}{\sqrt{v_{k-1}} - \epsilon} \qquad \text{Equation 6}$$

$$m_{k-1} = \beta_1 m_{k-2} + (1 - \beta_1) \hat{\nabla} f(w_{k-1})$$

$$v_{k-1} = \beta_2 v_{k-2} + (1 - \beta_2) \hat{\nabla} f(w_{k-1})^2$$

According to some embodiments, neural networks trained using the Adam learning algorithm typically show poorer generalization than similar neural networks trained using the SGD-based (e.g., SGD and SGDM) learning algorithms. For some quadratic problems, Adam may train neural networks where the generalization may be several orders of magnitude poorer than the SGD-based learning algorithms. However, Adam and the other adaptive learning algorithms tend to outperform the SGD-based learning algorithms during the early phases of training, but then tend to stagnate with additional training such that the SGD-based learning algorithms eventually surpass the adaptive learning algorithms with respect to the generalization ability of the neural networks being trained.

According to some embodiments, several approaches are available for addressing the convergence and/or generalization deficiencies of Adam and the other adaptive learning algorithms. In some examples, a variation of Adam called ND-Adam preserves the gradient direction by using a nested optimization procedure. ND-Adam, however, introduces an additional hyper-parameter along with the $\alpha$, $\beta_1$, and $\beta_2$ hyperparameters used by Adam. Unfortunately, this adaptation sacrifices the rapid initial training typically observed in neural networks trained using the Adam learning algorithm because of the non-monotonic nature of the training steps. In some examples, another variation of Adam called AMSGrad uses monotonic reductions in the step size. The generalization of neural networks trained using the AMSGrad learning algorithm, however, tend to be about the same as neural networks trained using the Adam learning algorithm and poorer than neural networks trained using the SGD-based learning algorithms.

Figure 3:
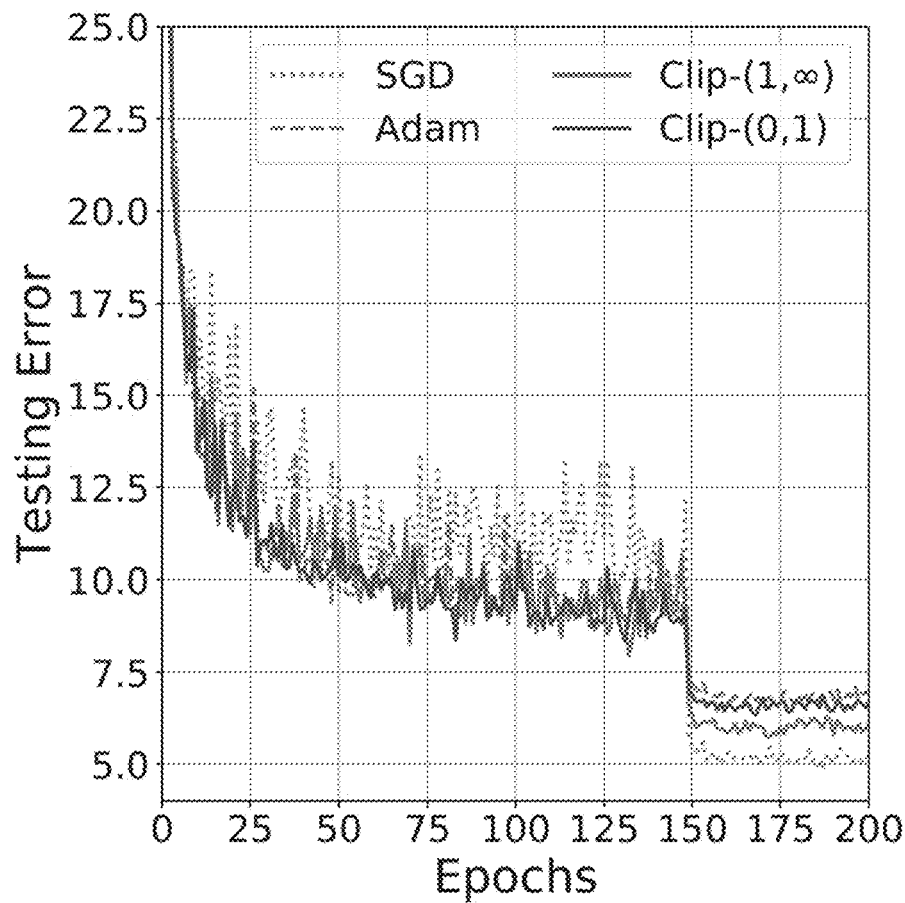
FIG. 3 is a simplified diagram of differences between learning algorithms according to some embodiments.

FIG. 3 is a simplified diagram of differences between learning algorithms according to some embodiments. FIG. 3 shows the effects on testing error (e.g., an indicator of generalization) for the DenseNet neural network trained using the CIFAR-10 data set over training epochs where each of images and classifications from the training set of CIFAR-10 are presented with training occurring based on the respective learning algorithm with the testing error being determined based on each of the images and classifications from the testing set of CIFAR-10 as applied to the trained DenseNet neural network after each training epoch. FIG. 3 shows the training error for both the SGD and Adam learning algorithms as well as two variations to the Adam learning algorithm called Adam-Clip where the parameters of the neural network are updated according to Equation 7, where clip(x, a, b) clips each of the elements of a vector x such that there are constrained to be within the range of [a,b] and $\alpha_{sgd}$ is the corresponding learning rate for the SGD learning algorithm. The large jump in testing error at epoch 150 is due to a scheduled change in learning rate as is discussed in further detail below.

$$w_k = w_{k-1} - \text{clip}\left(\frac{\sqrt{1-\beta_2^k}}{1-\beta_1^k} \frac{\alpha_{k-1}}{\sqrt{v_{k-1}} - \epsilon}, p\alpha_{sgd}, q\alpha_{sgd}\right) m_{k-1} \quad \text{Equation 7}$$

As shown in FIG. 3, the neural network trained using the SGD training algorithm converges to the expected testing error of approximately 5 percent while the neural network trained using the Adam learning algorithm stagnates in testing error at around 7 percent error. In some examples, fine-tuning of the learning rate schedule (primarily the initial value, reduction amount and the timing) did not lead to better improvements in the testing error. The neural network trained using the Adam-Clip(0, 1) training algorithm showed no improvement over the neural network trained using the Adam learning algorithm and the neural network trained using the Adam-Clip(1,∞) training algorithm partially closes the generalization gap between the neural networks trained using the Adam and SGD training algorithms by achieving a final accuracy of approximately 6 percent.

Accordingly, it would be advantageous to develop a learning algorithm that is able to use the strengths of both the adaptive learning algorithms (e.g., Adam) and the SGD-based learning algorithms so as to take advantage of the repaid early learning by the adaptive learning algorithm and the better generalization by the SGD-based learning algorithms. It would be further advantageous to support this hybrid learning approach without introducing significant overhead (e.g., without adding an additional hyper-parameter) to determine when to switch between the two learning algorithms and/or to provide a suitable starting value for the learning rate parameter of the SGD-based learning algorithm after the switch.

According to some examples, an additional hyper-parameter may be avoided and additional overhead may be reduced by using the training step used by the adaptive learning algorithm to determine when to switch to the SGD-based learning algorithm and to provide a good starting learning rate for the SGD-based learning algorithm after the switch.

Figure 4:
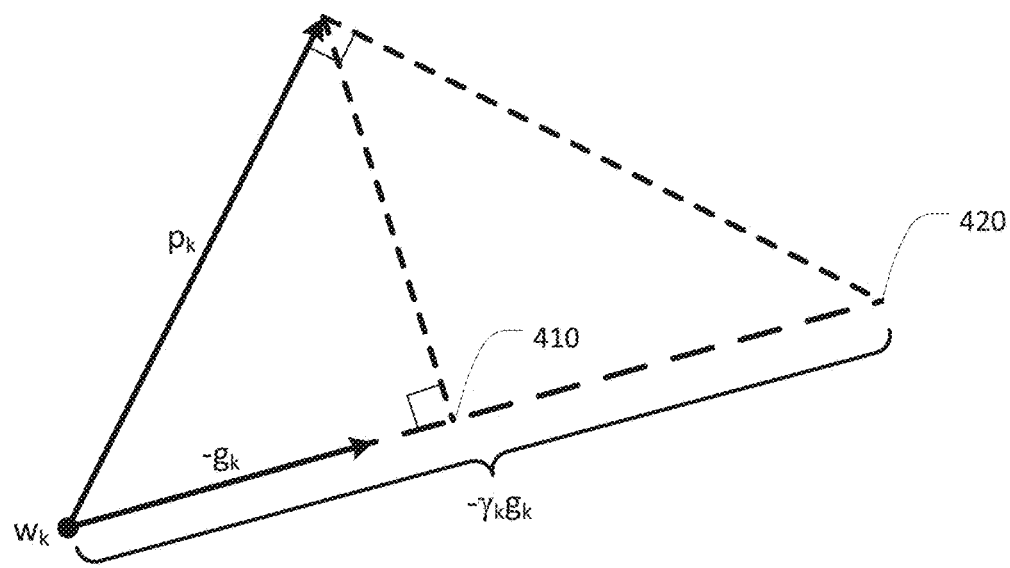
FIG. 4 is a simplified diagram of learning rate estimation according to some embodiments.

FIG. 4 is a simplified diagram of learning rate estimation according to some embodiments. FIG. 4 demonstrates, in two-dimensional fashion, the geometric relationship between the gradient $g_k$ of the loss function f and the learning step $p_k$ proposed by the adaptive learning algorithm as shown in Equation 8, which corresponds to the $w_k$ update as part of any one of Equations 4-7. And although FIG. 4 shows the relationship between gradient $g_k$ and learning step $p_k$ in two-dimensions, this is for representational purposes only as both $g_k$ and $p_k$ are n-dimensional values.

$$w_k = w_{k-1} + p_k \quad \text{Equation 8}$$

There are several possible ways to determine a scaling $\gamma_k$ for the gradient $g_k$ so that its length with the scaling $\gamma_k$ is correspondingly related to the length of learning step $p_k$. This allows the learning rate for the SGD-based learning rule after the switch to apply an update with a magnitude commensurate with the step $p_k$ for the adaptive learning algorithm before the switch in learning algorithms. In some examples, the scaling $\gamma_k$ may be determined by the ratio of the relative lengths of $g_k$ and $p_k$ as shown in Equation 9. In practice, however, the scaling of Equation 9 tends to overlook the relevance of the angular difference between $p_k$ and $g_k$.

$$\gamma_k = \frac{\|p_k\|}{\|g_k\|} \quad \text{Equation 9}$$

In some examples, scaling $\gamma_k$ may be determined using the orthogonal projection of $p_k$ onto $-g_k$, which would scale $-g_k$ to a length that corresponds to the point 410 in FIG. 4. In practice, however, this tends to underestimate the learning rate that is best for the SGD-based learning algorithm after the switch.

In some examples, scaling $\gamma_k$ may be determined using the orthogonal projection of $-\gamma_k g_k$ onto $p_k$, which would scale $-g_k$ to a length that corresponds to the point 420 in FIG. 4. This corresponds to the scaling $\gamma_k$ as shown in Equation 10.

$$\gamma_k = \frac{p_k^T p_k}{-p_k^T g_k} \quad \text{Equation 10}$$

In some examples, because $\gamma_k$ is a noisy estimate of the scaling to apply after the switch to the SGD-based learning algorithm, a smoothing, an averaging and/or a filtering is applied to $\gamma_k$, such as by using an exponential moving average of $\gamma_k$. In some examples, the $\beta_2$ hyper-parameter from the adaptive learning algorithm may be used as the exponential moving average hyper-parameter to avoid introducing another hyper-parameter to the overall learning algorithm as shown in Equation 11.

$$\lambda_k = \beta_2 \lambda_{k-1} + (1-\beta_2)\gamma_k \quad \text{Equation 11}$$

In some examples, the switch-over point between the adaptive learning algorithm and the SGD-based learning algorithm may be determined by comparing the bias-corrected exponential moving average of Equation 11 and the current scaling $\gamma_k$ to detect when there appears to be convergence between the biased-corrected exponential moving average and the current scaling $\gamma_k$ as shown in Equation 12, where E represents a small additive constant for numerical stability. In some examples, once the condition of Equation 12 is true, the learning algorithm switches from the adaptive learning algorithm to the SGD-based learning algorithm using the learning rate $\lambda_k$ of Equation 11 as the learning rate for the SGD-based learning algorithm.

$$\left| \frac{\lambda_k}{1 - \beta_2^k} - \gamma_k \right| < \epsilon \qquad \text{Equation 12}$$

Figure 5:
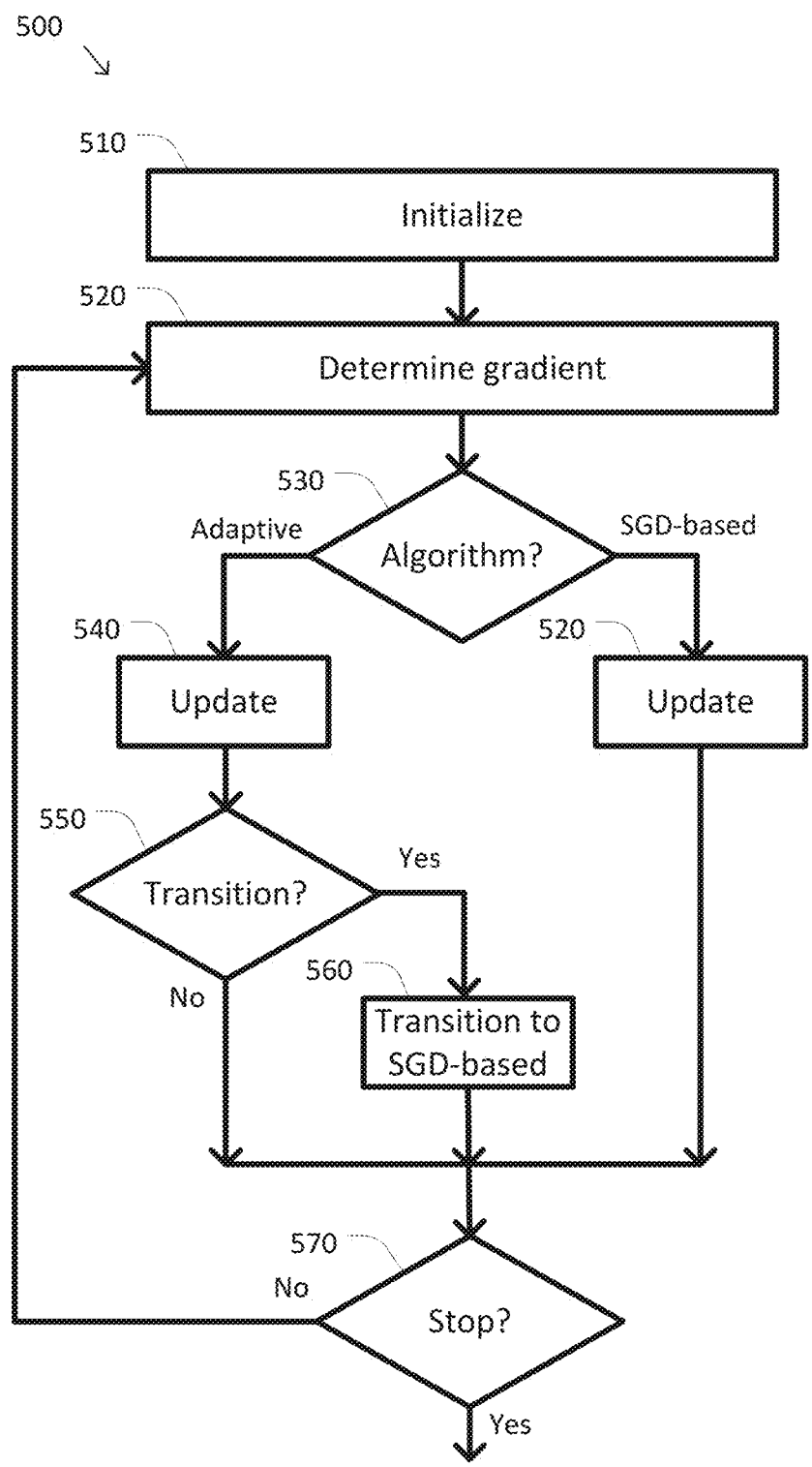
FIG. 5 is a simplified diagram of a method for hybrid deep learning according to some embodiments.

FIG. 5 is a simplified diagram of a method 500 for hybrid deep learning according to some embodiments. One or more of the processes 510-580 of method 500 may be implemented, at least in part, in the form of executable code stored on non-transitory, tangible, machine-readable media that when run by one or more processors may cause the one or more processors to perform one or more of the processes 510-580. In some embodiments, method 500 may be used by training module 140 to train neural network 130. In some embodiments, the hybrid deep learning of method 500 includes beginning training using an adaptive learning algorithm (e.g., Adam, Adagrad, RMSProp, Adadelta, AdaMax, Nadam, AMSGrad, and/or the like to take advantage of the rapid early gains of the adaptive learning algorithm and then switch over to a SGD-based learning algorithm (e.g., SGD, SGDM, and/or the like) to obtain the better overall convergence provided by the SGD-based learning algorithm.

At a process 510, the learning algorithm is initialized. In some examples, the initialization may include determining initial weights and offsets for the neural network, such as by initializing them to random values. In some examples, the initialization may include setting various parameters for the training algorithms include a learning rate $\alpha$ (e.g., initialized to $10^{-3}$), various hyper-parameters (e.g., $\beta_1$ to 0.9, $\beta_2$ to 0.999) various training variables (e.g., $m_0$ to 0, and $a_0$ to 0), an error margin E (e.g., initialized to $10^{-9}$), and an initial learning algorithm selected from one of the adaptive learning algorithms (e.g., Adam).

At a process 520, the gradient is determined. In some examples, the gradient $g_k$ is determined by applying training data to the neural network and estimating the gradient, where k is the current iteration of the learning algorithm. In some examples, the gradient $g_k$ is based on the parameters (e.g., the current weights and offsets) $w_{k-1}$ for the neural network.

At a process 530, it is determined which type of learning algorithm is currently being used to update the neural network. When the type of the current learning algorithm is an adaptive learning algorithm, the neural network is updated according to the adaptive learning algorithm beginning with a process 540. When the type of the current learning algorithm is an SGD-based learning algorithm, the neural network is updated according to the SGD-based learning algorithm beginning with a process 580.

At the process 540, the parameters $w_k$ of the neural network are updated according to the adaptive learning algorithm, which depends on which of the adaptive learning algorithms is being used. In some examples, when the adaptive learning algorithm is Adagrad, the parameters of the neural network are updated according to Equation 4. In some examples, when the adaptive learning algorithm is RMSProp, the parameters of the neural network are updated according to Equation 5. In some examples, when the adaptive learning algorithm is Adam, the parameters of the neural network are updated according to Equation 6. In some examples, when the adaptive learning algorithm is AdamClip, the parameters of the neural network are updated according to Equation 7.

At a process 550, it is determined whether the learning algorithm should transition from the current adaptive learning algorithm to an SGD-based learning algorithm. In some examples, process 550 begins by determining an estimate of a scaling $\gamma_k$. In some examples, the estimate of scaling $\gamma_k$ may be based on the difference between the training step for $w_k$ used during process 540 and the estimate of the gradient $g_k$ from process 520. In some examples, the scaling $\gamma_k$ may be determined using the length ratio of Equation 9, the orthogonal projection of $p_k$ onto $-g_k$, or the projection of $-\gamma_k g_k$ onto $p_k$ using Equation 10. In some examples, the scaling $\gamma_k$ may also be smoothed, averaged, and/or filtered to reduce noise, such as by applying the exponential moving average of Equation 11. In some examples, the decision whether to switch from the current adaptive learning algorithm to the SGD-based learning algorithm may be made when the smoothed, averaged, and/or filtering scaling appears to converge, such as by using the test of Equation 12. When the learning algorithm is to remain in the current adaptive learning algorithm, a stopping condition is checked using a process 570. When the learning algorithm is to switch to the SGD-based learning algorithm, the learning algorithm is switched using a process 560.

At the process 560, the learning algorithm is transitioned to a SGD-based learning algorithm. In some examples, the SGD-based learning algorithm is the SGD learning algorithm, which is initialized during process 560. In some examples, the SGD-based learning algorithm is the SGD learning algorithm, and the SGD learning algorithm is initialized according to Equation 13, where $\alpha_{k-1}$ is the starting learning rate for the SGD learning algorithm.

$$v_k = 0 \qquad \text{Equation 13}$$
$$\alpha_{k-1} = \frac{\lambda_k}{(1 - \beta_2^k)}$$

In some examples, the choice of SGD-based learning algorithm depends on the value of the $\beta_1$ hyper-parameter of the adaptive learning algorithm with SGD being chosen as the SGD-based learning algorithm with the initialization of Equation 13 when $\beta_1$ is less than or equal to zero and SGDM being chosen as the SGD-based leaning algorithm with initialization based on Equation 14 when $\beta_1$ is greater than zero, where the $(1-\beta_1)$ factor provides the common momentum correction for the SGDM learning algorithm.

$$v_k = 0 \qquad \text{Equation 13}$$
$$\alpha_{k-1} = \frac{(1 - \beta_1)}{(1 - \beta_2^k)} \lambda_k$$

After the SGD-based learning algorithm is selected and initialized, the stopping condition is checked using process 570.

At the process 570, it is determined whether a stopping condition is present. In some examples, the stopping condition may correspond to a maximum number of iterations of training (e.g., after 300 epochs) having occurred. In some examples, the stopping condition may correspond to convergence of the neural network to a minimum value for the cost function. When the stopping condition is not detected, another training iteration occurs by returning to process 520. When the stopping condition is detected, method 500 ends. Once method 500 ends, the neural network may be used to classify data, perform computations, and/or the like using the trained neural network as discussed above with respect to FIG. 1.

At the process 580, the parameters of the neural network are updated according to the SGD-based learning algorithm, which depends on which of the SGD-based learning algorithms is being used. In some examples, when the SGD-based learning algorithm is SGD, the parameters of the neural network are updated according to Equation 2. In some examples, when the SGD-based learning algorithm is SGDM, the parameters of the neural network are updated according to Equation 3. Once the parameters of the neural network are updated by process 580, the stopping condition is checked using process 570.

As discussed above and further emphasized here, FIG. 5 is merely an example which should not unduly limit the scope of the claims. One of ordinary skill in the art would recognize many variations, alternatives, and modifications. In some embodiments, method 500 may be modified so that at least one training iteration uses the initial adaptive learning algorithm selected during process 510.

In some embodiments, the learning rate of the learning algorithms may be adjusted according to other rules. In some examples, the learning rate may be reduced by a configurable amount (e.g., 10) after a configurable number of training iterations (e.g., after the $150^{th}$, $225^{th}$, and/or $262^{nd}$ epochs).

In some embodiments, additional switches between learning algorithms may also occur during method 500. In some examples, additional training using an adaptive learning algorithm after the stopping condition is detected (e.g., after a configurable number of epochs, such as 300) may result in additional improvements in the convergence of the neural network.

The capabilities of the hybrid learning algorithm of method 500 are further described below with respect to comparative results for different neural networks trained using different data sets and with different learning algorithms. FIGS. 6A-9B are simplified diagrams of differences between learning algorithms for various neural networks according to some embodiments. As shown in FIGS. 6A-9B, results (e.g., the testing error and/or validation perplexity) for the corresponding neural networks and data sets are shown for different learning algorithms. In FIGS. 6A-9B, SGD refers to either the better performing (e.g., the neural network version with the best generalization/final testing error/validation perplexity) of the SGD learning algorithm and the SGDM learning algorithm with the learning rate being coarsely tuned on a logarithmic scale from $10^{-3}$ to $10^2$ and then finely tuned to find the best performing variation. Adam refers to the best performing version of the neural network trained using the Adam adaptive learning algorithm with learning rates selected from a grid of {0.0005, 0.0007, 0.001, 0.002, 0.003, 0.004, 0.005}. SWATS (SWitches from Adam To SGD) refers to the best performing version the neural network trained using the hybrid learning algorithm of method 500 with the initial adaptive learning algorithm being Adam and the switch to SGD or SGDM learning algorithm based on the Pi selection criteria discussed with respect to process 560, where the learning rates are selected from a grid of {0.0005, 0.0007, 0.001, 0.002, 0.003, 0.004, 0.005}. In each case, hyper-parameters such as batch size, dropout probability, $l_2$-norm decay, etc. were chosen to match the recommendations of the respective base neural network architecture. Each of the neural networks was trained with a stopping condition of 300 epochs and additionally, the learning rate was reduced by 10 after the $150^{th}$, $225^{th}$, and $262^{nd}$ epochs.

Figure 6A:
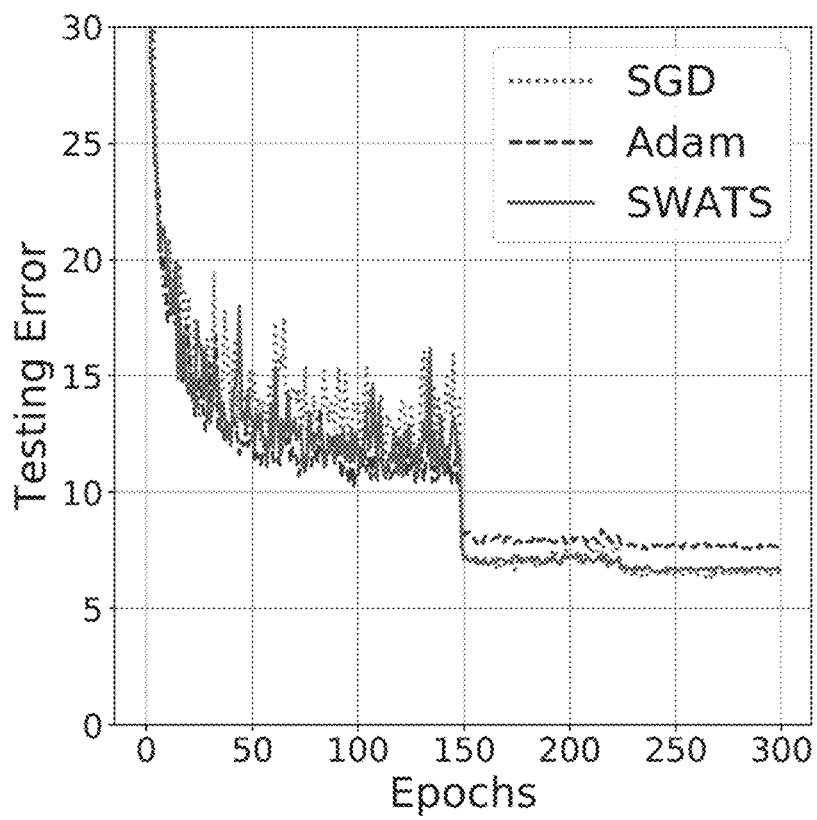
FIGS. 6A-9B are simplified diagrams of differences between learning algorithms for various neural networks according to some embodiments.
Figure 6B:
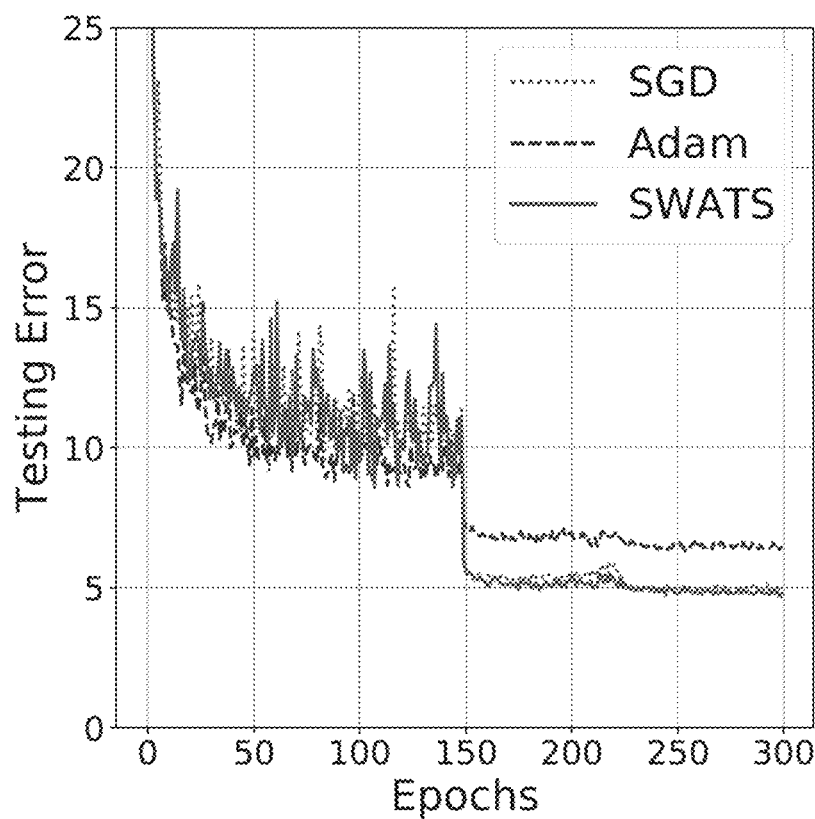
Figure 6C:
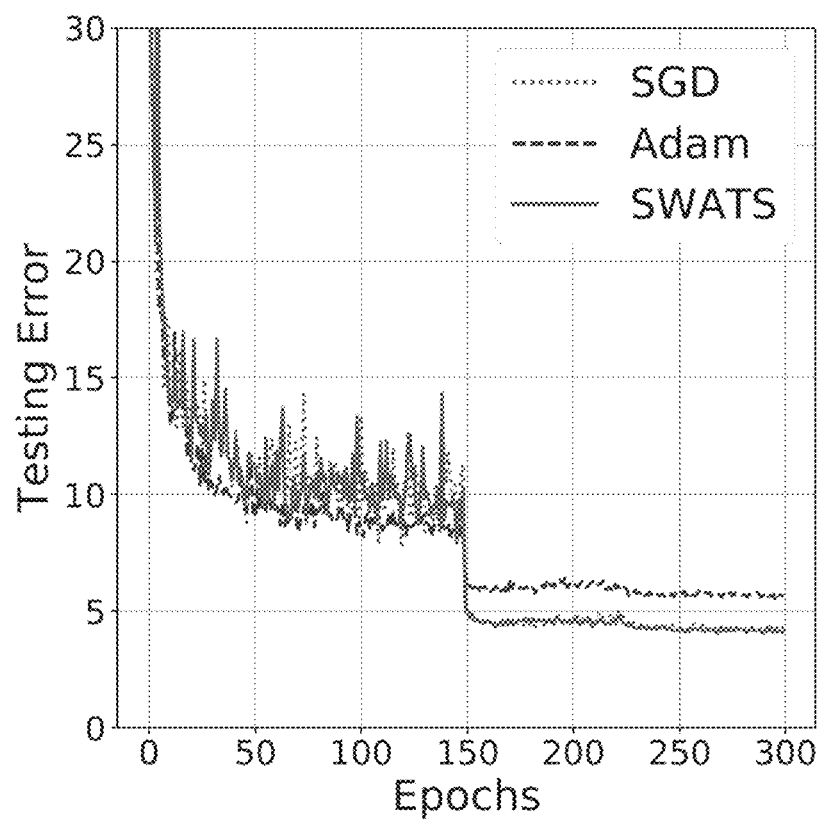
Figure 6D:
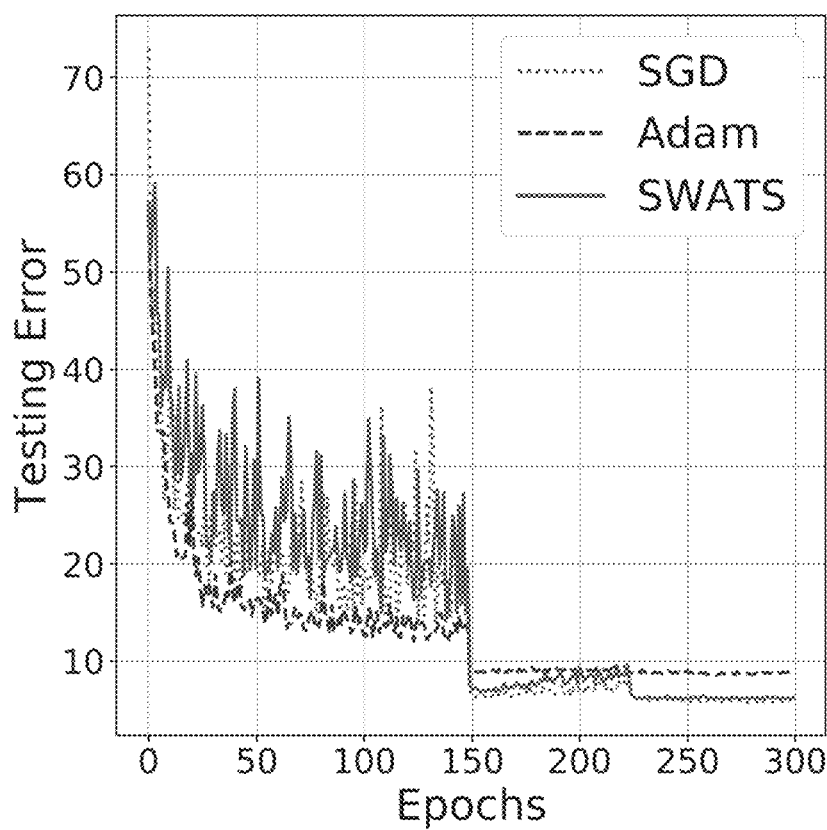
Figure 7A:
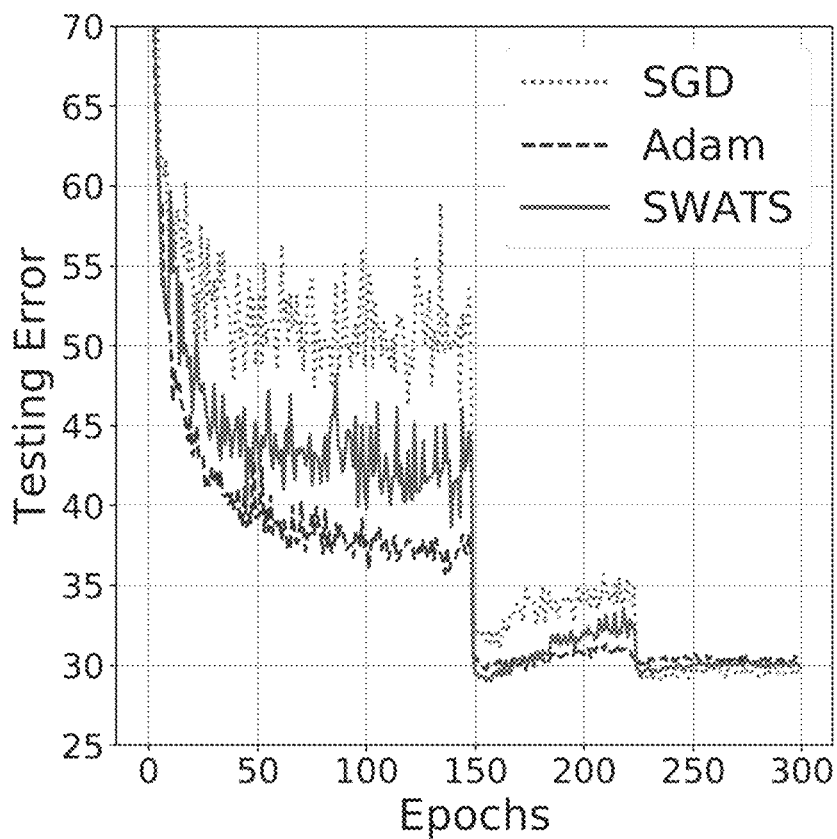
Figure 7B:
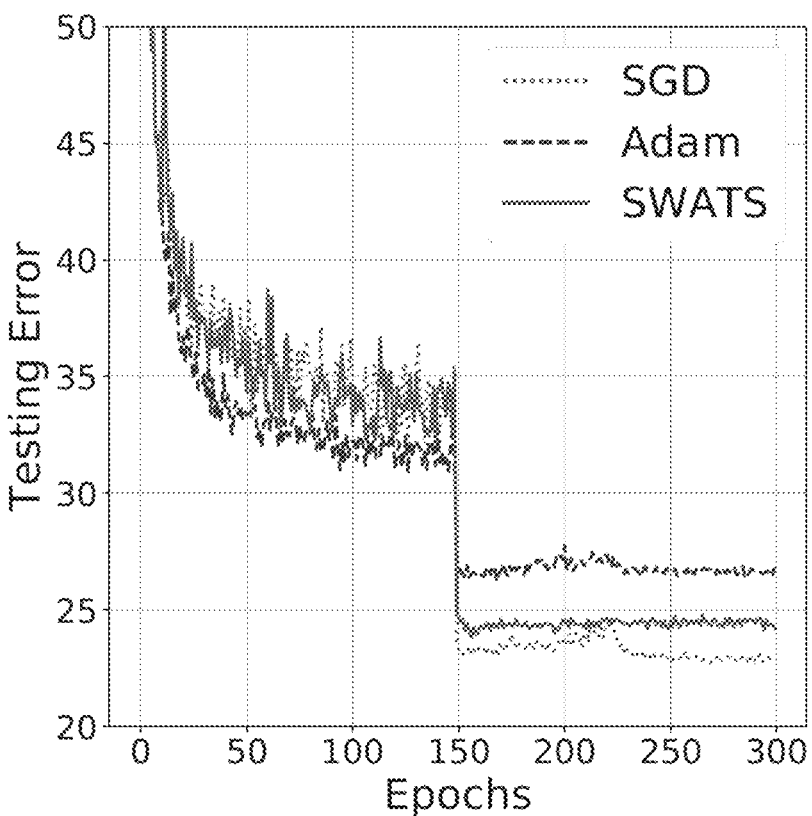
Figure 7C:
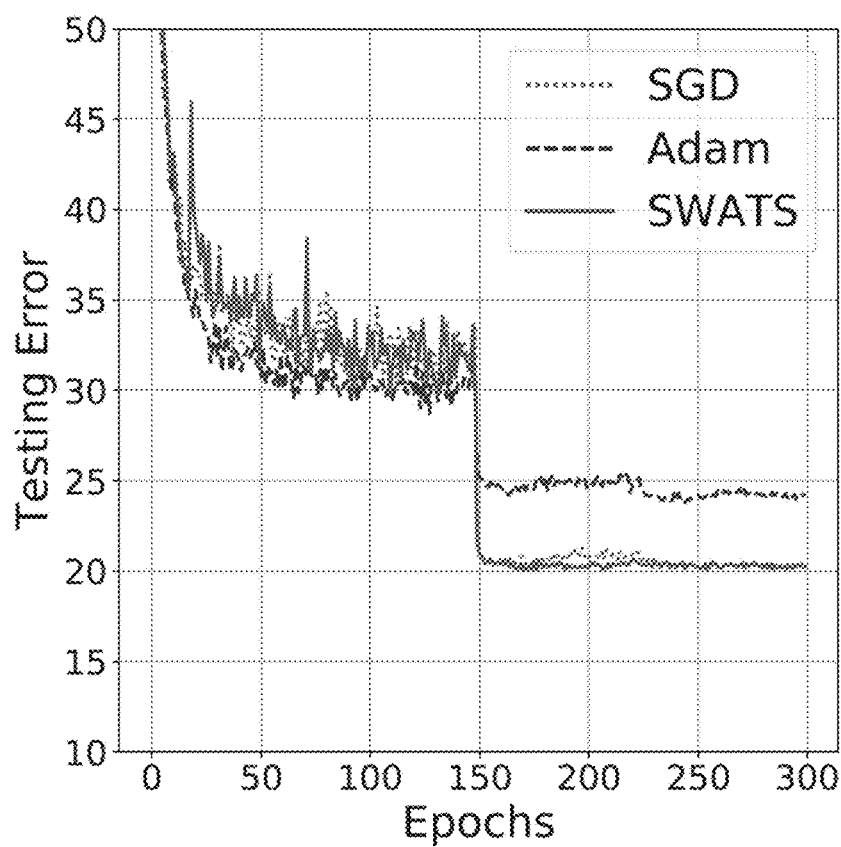
Figure 7D:
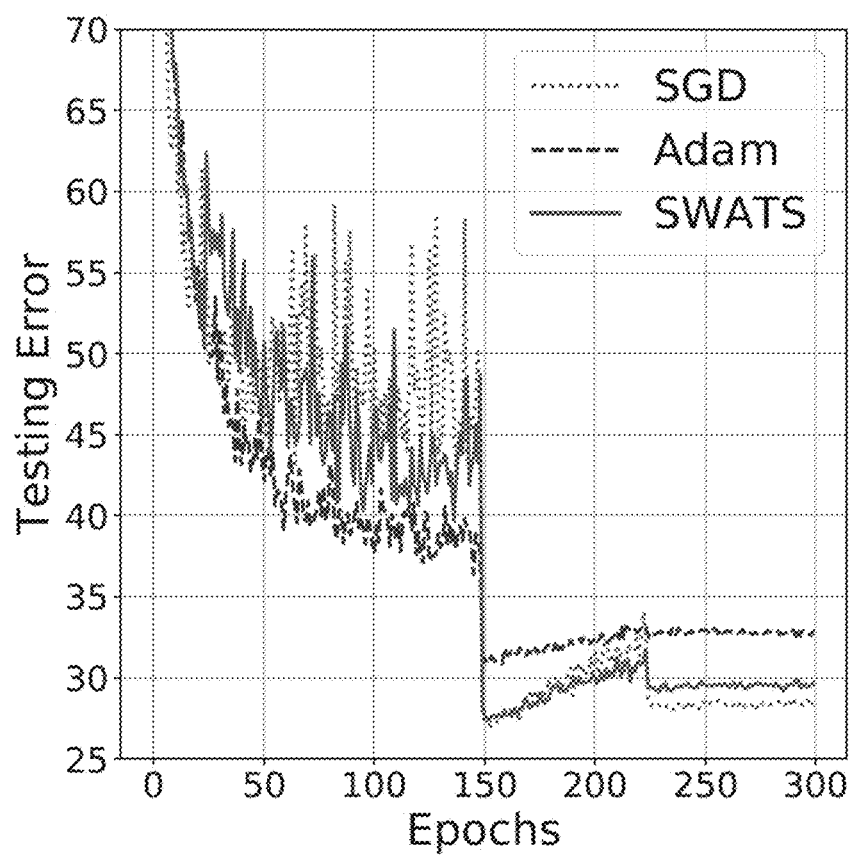
Figure 8A:
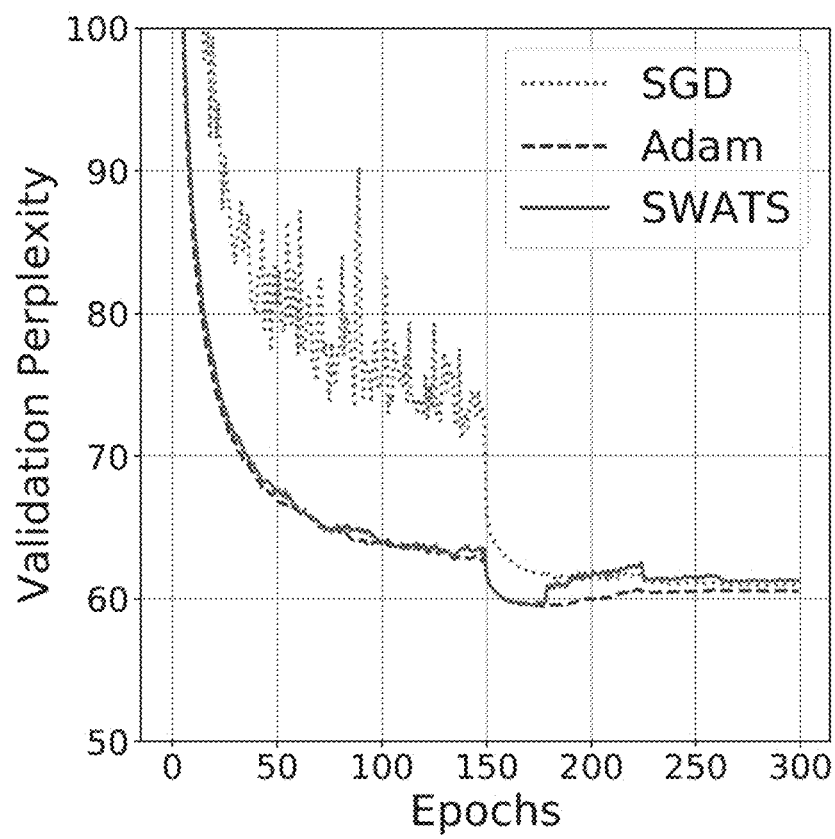
Figure 8B:
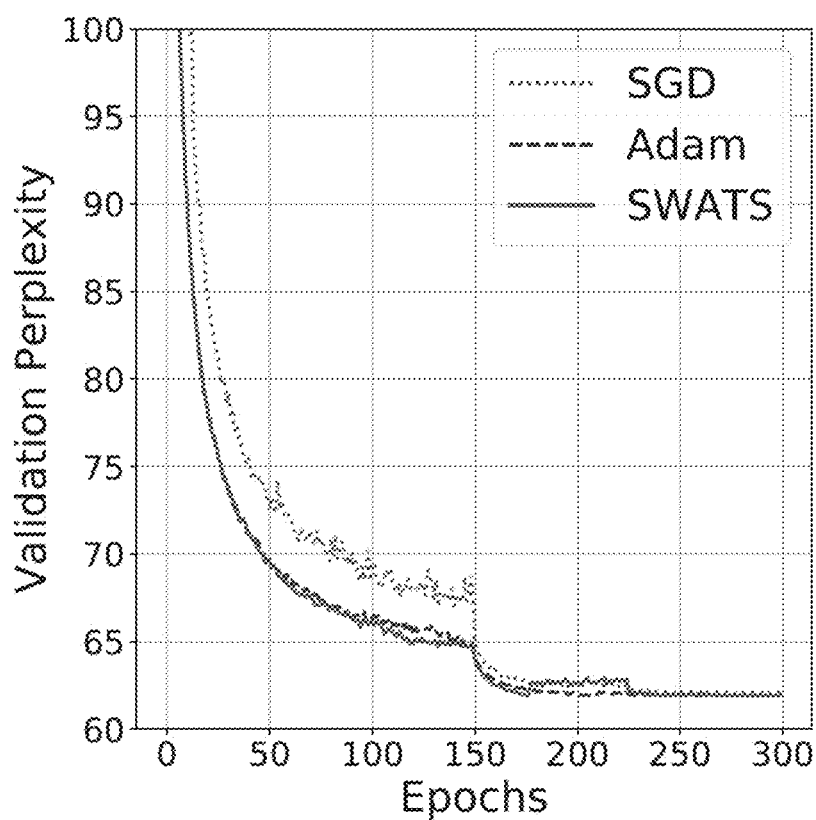
Figure 9A:
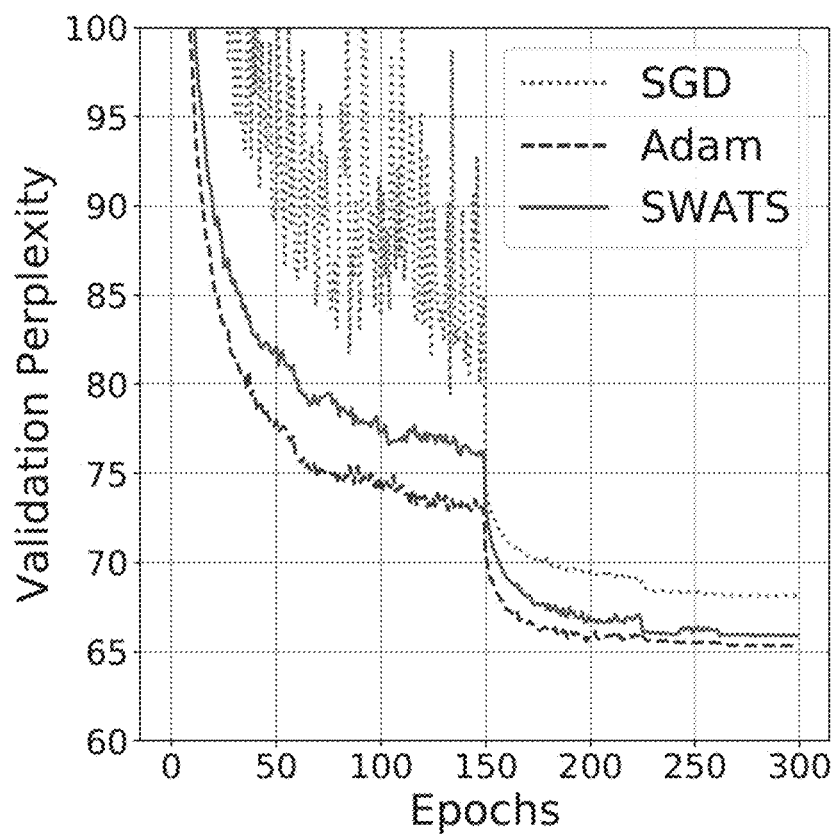
Figure 9B:
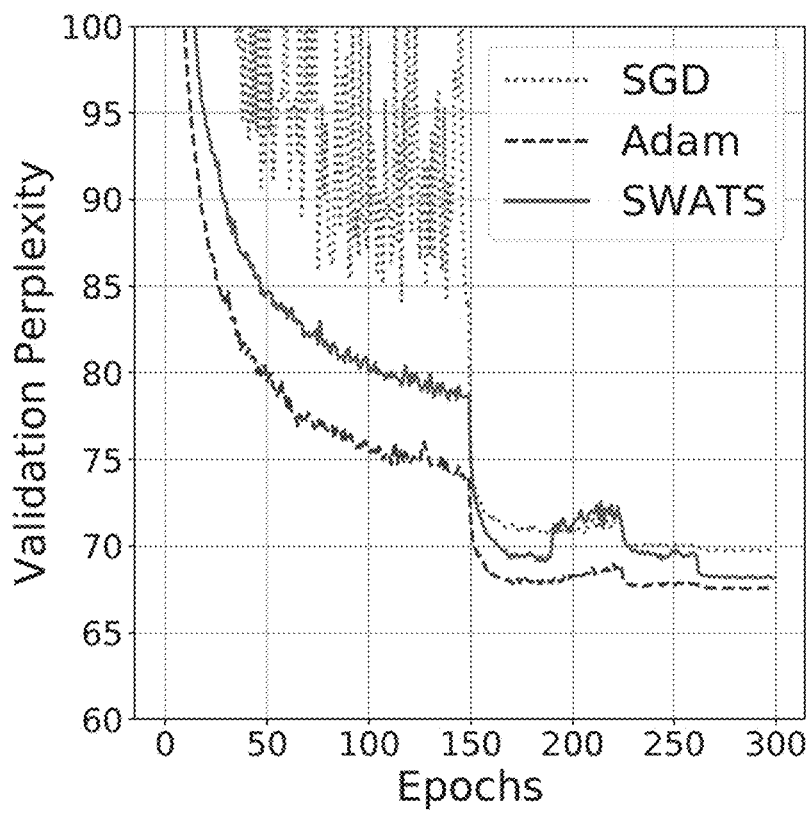

FIG. 6A shows the results for a ResNet-32 neural network trained using the CIFAR-10 data set. FIG. 6B shows he results for a DenseNet neural network trained using the CIFAR-10 data set. FIG. 6C shows the results for a PyramidNet neural network trained using the CIFAR-10 data set. FIG. 6D shows he results for a SENet neural network trained using the CIFAR-10 data set. FIG. 7A shows the results for a ResNet-32 neural network trained using the CIFAR-100 data set. FIG. 7B shows he results for a DenseNet neural network trained using the CIFAR-100 data set. FIG. 7C shows the results for a PyramidNet neural network trained using the CIFAR-100 data set. FIG. 7D shows he results for a SENet neural network trained using the CIFAR-100 data set. FIG. 8A shows the results for an AWD-LSTM neural network trained using the Penn Treebank (PTB) data set. FIG. 8B shows he results for an AWD-QRNN neural network trained using the Penn Treebank data set. FIG. 9A shows the results for an AWD-LSTM neural network trained using the WikiText-2 (WT-2) data set. FIG. 9B shows he results for an AWD-QRNN neural network trained using the WikiText-2 data set.

In each of the image classification examples using the CIFAR-10 and CIFAR-100 data sets (e.g., FIGS. 6A-7D), using the Adam adaptive learning algorithm alone failed to train the neural network with good generalization despite making good initial progress. In contrast, both the SGD and SWATS trained neural network demonstrated better overall performance. In some examples, the generalization of the neural network temporarily degraded after the switch between learning algorithms, but recovered.

In each of the language modeling examples using the Penn Treebank and WikiText-2 data sets (e.g., FIGS. 8A-9B), the neural networks trained using the Adam adaptive learning algorithm out-performed the neural networks trained using the SGD learning algorithm and the neural networks trained using the SWATS hybrid learning algorithm performed similarly to the Adam adaptive learning algorithm trained neural networks.

FIG. 10 is a simplified diagram of training metadata according to some embodiments. More specifically, FIG. 10 shows metadata regarding the application of the SGDM, Adam, and SWATS learning algorithms to the training of the indicated neural networks using the indicated data sets for the training variation that resulted in the neural network with the best classification. The SGDM, Adam, and SWATS columns indicate the initial learning rate for the respective algorithm, the $\alpha_{k-1}$ column indicates the starting learning rate for the SGD-based learning algorithm when the SWATS learning algorithm (e.g., method 500) switched over to the SGD-based learning algorithm, and the switchover point column indicates, in terms of epochs, when the switch over to the SGD-based learning algorithm occurred.

Figure 11A:
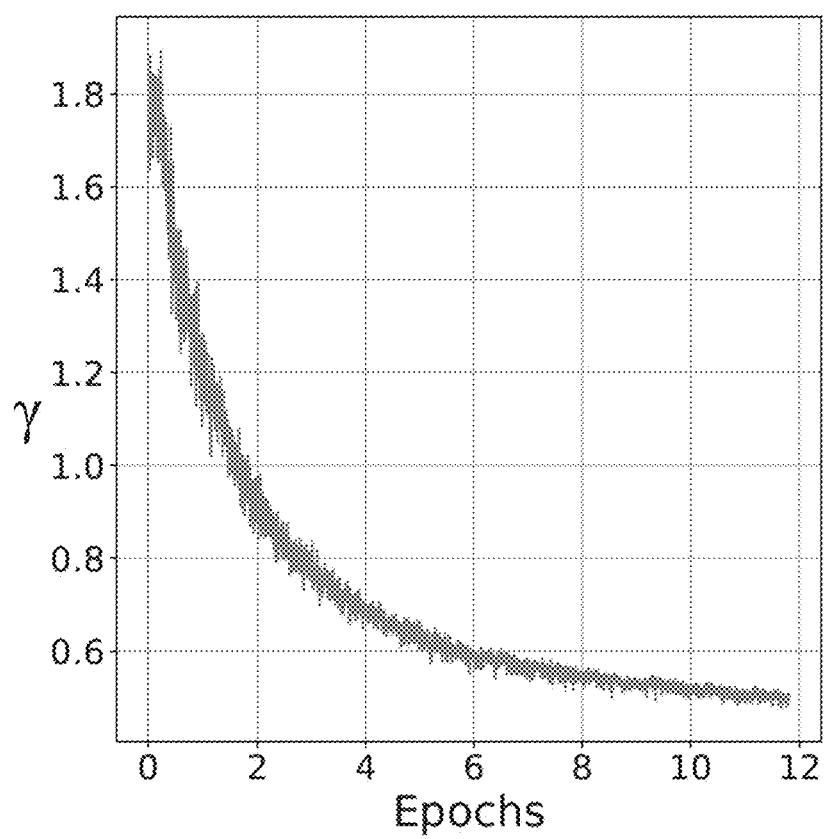
FIGS. 11A and 11B are simplified diagrams of estimated learning rate according to some embodiments.
Figure 11B:
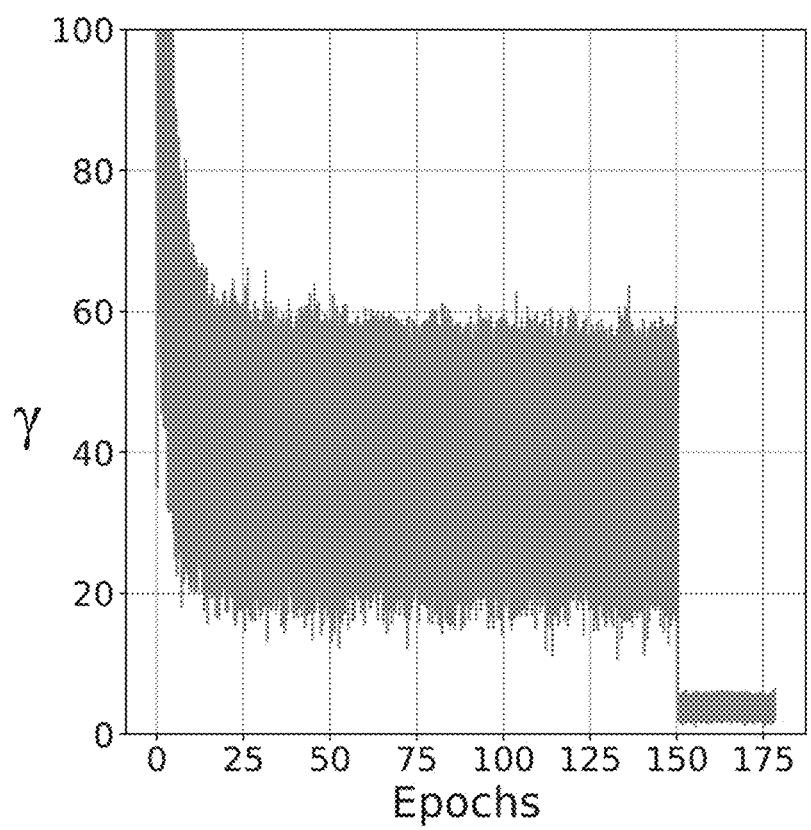

FIGS. 11A and 11B are simplified diagrams of estimated learning rate according to some embodiments. More specifically, FIG. 11A shows the evolution of the estimate of the SGD-based learning rate $\gamma_k$ (e.g., from Equation 10) for the training of a DenseNet neural network using the CIFAR-100 data set. FIG. 11B shows the evolution of the estimate of the SGD-based learning rate $\gamma_k$ for the training of an AWD-QRNN neural network using the Penn Treebank data set.

Some examples of computing devices, such as computing device 100 may include non-transitory, tangible, machine readable media that include executable code that when run by one or more processors (e.g., processor 110) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for deep learning, the system comprising:
a memory storing a multi-layer neural network and a plurality of processor-executable instructions;
a processor reading and executing the plurality of processor-executable instructions from the memory to:
set a current learning algorithm to a first learning algorithm; and
iteratively perform a series of operations to:
determine a gradient for parameters of the multi-layer neural network by applying training data;
update the parameters based on the current learning algorithm and the gradient;
determine that the current learning algorithm is to be switched to a second learning algorithm based on a convergence that is reached between a bias-corrected exponential moving average of a first learning rate of the current learning algorithm and a scaling value computed from the gradient and a learning step of the current learning algorithm; and
in response to the determining that the current learning algorithm is to be switched to the second learning algorithm:
change the current learning algorithm to the second learning algorithm, and
initialize a second learning rate of the second learning algorithm based on the gradient and a step size used by the second learning algorithm to update the parameters of the multi-layer neural network.

2. The system of claim 1, wherein the first learning algorithm is an adaptive learning algorithm.

3. The system of claim 1, wherein the second learning algorithm is stochastic gradient descent-based learning algorithm.

4. The system of claim 1, wherein the second learning rate of the second learning algorithm is initialized to the scaling value based on an orthogonal projection of a negative of the gradient during the step used by the first learning algorithm to update the parameters of the multi-layer neural network.

5. The system of claim 1, wherein the scaling value is an exponential moving average of scaling values from multiple iterations.

6. The system of claim 1, wherein to determine that the current learning algorithm is to be switched to the second learning algorithm, the system is further configured to determine whether the scaling value has converged to the bias-corrected exponential moving average of the first learning rate.

7. The system of claim 1, wherein the system is further configured to stop the iteration in response to detecting a stopping condition.

8. The system of claim 1, wherein the iterations are performed without introducing an additional hyper-parameter beyond hyper-parameters used by the first and second learning algorithms.

9. A method comprising:
setting a current learning algorithm for a multi-layer neural network to a first learning algorithm; and
iteratively performing a series of operations comprising:
applying training data to the multi-layer neural network;
determining a gradient for parameters of the multi-layer neural network based on the applying of the training data;
updating the parameters based on the current learning algorithm;
determining that the current learning algorithm is to be switched to a second learning algorithm based on a convergence that is reached between a bias-corrected exponential moving average of a first learning rate of the current learning algorithm and a scaling value computed from the gradient and a learning step size of the current learning algorithm; and
in response to the determining that the current learning algorithm is to be switched to the second learning algorithm:
changing the current learning algorithm to the second learning algorithm; and
initializing a second learning rate of the second learning algorithm based on the gradient and a step size used by the first learning algorithm to update the parameters of the multi-layer neural network.

10. The method of claim 9, wherein the first learning algorithm is an adaptive learning algorithm.

11. The method of claim 9, wherein the second learning algorithm is stochastic gradient descent-based learning algorithm.

12. The method of claim 9, wherein initializing the second learning rate of the second learning algorithm comprises initializing the second learning rate of the second learning algorithm to the scaling value based on an orthogonal projection of a negative of the gradient during the step used by the first learning algorithm to update the parameters of the multi-layer neural network.

13. The method of claim 9, wherein the scaling value is an exponential moving average of scaling values from multiple iterations.

14. The method of claim 9, wherein determining that the current learning algorithm is to be switched to the second learning algorithm comprises determining whether the scaling value has converged to the bias-corrected exponential moving average of the first learning rate.

15. The method of claim 9, further comprising stopping the iteration in response to detecting a stopping condition.

16. The method of claim 9, wherein the iterations are performed without introducing an additional hyper-parameter beyond hyper-parameters used by the first and second learning algorithms.

17. A non-transitory machine-readable medium comprising a plurality of machine-readable instructions which when executed by one or more processors associated with a computing device are adapted to cause the one or more processors to perform a method comprising:
- setting a current learning algorithm for a multi-layer neural network to a first learning algorithm; and
- iteratively performing a series of operations comprising:
  - applying training data to the multi-layer neural network;
  - determining a gradient for parameters of the multi-layer neural network based on the applying of the training data;
  - updating the parameters based on the current learning algorithm;
  - determine that the current learning algorithm is to be switched to a second learning algorithm based on a convergence that is reached between a bias-corrected exponential moving average of a first learning rate of the current learning algorithm and a scaling value computed from the gradient and a learning step of the current learning algorithm; and
  - in response to the determining that the current learning algorithm is to be switched to the second learning algorithm:
    - changing the current learning algorithm to the second learning algorithm; and
    - initializing a second learning rate of the second learning algorithm based on the gradient and a step size used by the first learning algorithm to update the parameters of the multi-layer neural network.

18. The non-transitory machine-readable medium of claim 17, wherein the first learning algorithm is an adaptive learning algorithm and the second learning algorithm is stochastic gradient descent-based learning algorithm.

19. The non-transitory machine-readable medium of claim 17, wherein initializing the second learning rate of the second learning algorithm comprises initializing the second learning rate of the second learning algorithm to the scaling value based on an orthogonal projection of a negative of the gradient during the step used by the first learning algorithm to update the parameters of the multi-layer neural network.

20. The non-transitory machine-readable medium of claim 17, wherein determining that the current learning algorithm is to be switched to the second learning algorithm comprises determining whether the scaling value has converged to the bias-corrected exponential moving average of the first learning rate.

* * * * *